March 21, 1950 H. H. MOHAUPT Re. 23,211

METHOD AND APPARATUS FOR CUTTING OR PUNCHING SHEET MATERIAL

Original Filed May 21, 1942

Inventor

H. H. Mohaupt,

By Blair Wilcox

Attorneys

Reissued Mar. 21, 1950

Re. 23,211

UNITED STATES PATENT OFFICE 23,211

METHOD AND APPARATUS FOR CUTTING OR PUNCHING SHEET MATERIAL

Henry H. Mohaupt, Fort Worth, Tex., assignor to Welex Jet Services, Inc., a corporation of Texas Original No. 2,407,093, dated September 3, 1946, Serial No. 443,958, May 21, 1942. Application for reissue September 2, 1947, Serial No. 771,745

18 Claims. (Cl. 102—22)

Matter enclosed in heavy brackets [ ] appears in the original patent but forms no part of this reissue specification; matter printed in italics indicates the additions made by reissue

This invention relates to a simple and practical method and apparatus for cutting or punching sheet or plate material, usually of a ferrous character such as iron or steel.

One of the objects of the present invention is to provide an improved relatively small, compact and self-contained article especially adapted for cutting or punching holes in sheet metal.

A further object is to provide an article of the above character which may be inexpensively manufactured and assembled, and which will be reliable and safe in use and operation in proper hands.

A further object is to provide an article of the above character requiring little or no external means for operating the same at the place desired.

A further object is to provide an improved method of quickly cutting or punching holes in sheet metal or the like.

Other objects will be in part obvious and in part hereinafter pointed out in connection with the following analysis of this invention wherein is illustrated an embodiment of the invention in detail.

Figure 2:
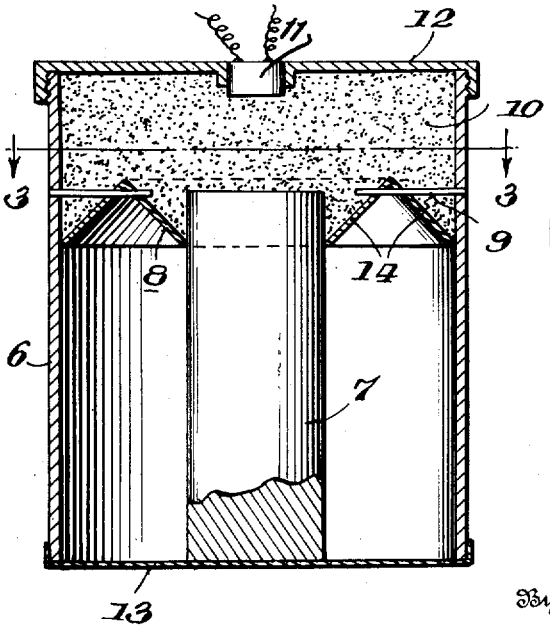
Fig. 2 is a vertical longitudinal sectional view of the complete device.
Figure 3:
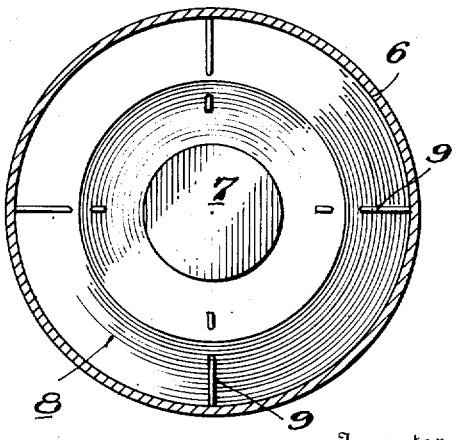
Fig. 3 is a sectional plan view taken substantially on the line 3—3 of Fig. 2 with parts removed for the sake of clearness.

Referring now to the drawing in detail, 5 indicates diagrammatically a sheet of material through which a hole is to be punched or cut by means of the device shown positioned thereon or in section in Fig. 2. This device comprises a container 6 which, for cheapness and simplicity of manufacture, is preferably made cylindrical in form with a substantially smooth unobstructed inner surface, having a height slightly greater than its diameter. While shown cylindrical, it of course could be a polygon of any desired number of sides, but such construction is less desirable because of the difficulty of manufacture.

Centrally disposed within this cylinder is a guide member 7 which may be a solid bar or a tube as desired, which is concentrically disposed with relation to the container 6 and is for the purpose of positioning and guiding a cutter or punch 8.

Figure 1:
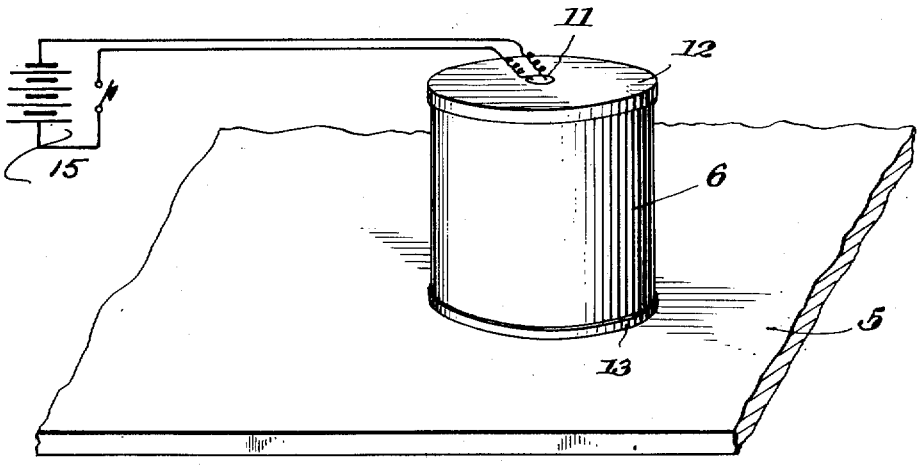
Fig. 1 is a semi-diagrammatic perspective view of the device in operative position upon a sheet of material to be punched.

This cutter or punch as herein shown is annular in plan view and V-shaped on any radius, the open part of the V facing downwardly with relation to the other parts when in the position shown in Figs. 1 or 2. This cutter or punch 8 is of any suitable metal, and may be mild steel, which may be easily and quickly deformed and collapsed under the tremendous pressure, heat and action of the explosive indicated at 10 and positioned in the upper part of the container 6. The explosive, which may be of any suitable kind, is preferably a relatively small quantity of TNT, or any other powerful explosive, which is detonated or ignited by any suitable means such as a detonator or cap 11.

The term "detonating" herein used in the specification and claims is to be construed broadly as including any means or method of initiating the action of the explosive within the container.

The upper and lower ends of the container 6 may be closed, if desired, as by means of thin cover plates 12 and 13. These can be of fiber or very thin sheet metal and are used primarily to protect the explosive against moisture and displacement.

It will be noted particularly that the cutter or punch 8 has a frictional fit with respect to the inner wall of the container 6 and the guide 7 and in certain cases may be held in place by its adhesion to the explosive 10 placed thereabove, which in certain cases is melted and either poured in the top, or the container may be inverted and, while the explosive is still in a semi-plastic condition, the cylinder 7 and cutter 8 may be pressed downwardly into the semi-molten or plastic mass. Of course, if desired shear pins or the like, such as indicated at 9 may be used in order to prevent relative movement of the parts if handled roughly.

This cutter 8 for the size hereinafter described, is preferably spaced from the bottom 13 of the container 6 a distance substantially equal to the diameter of the case and, being held in position largely by its frictional engagement with its coacting parts, is otherwise free to move downwardly with respect to the smooth substantially unobstructed inner surface of the container. However, when the explosive charge is detonated, the extremely rapid formation of the gases forces the cutter downwardly at very high speed and at the same time causes the two sides 14 of the V-ring to move into intimate engagement. The intense heat generated literally fuses the two sides of the V into one solid mass constituting a substantial cutting or punching tool. The cutter thus formed thereby is driven downwardly against the plate 5 at tremendous speed and great force and will by reason of its mass and inertia instantly cut or punch an opening in the plate 5 conforming to the shape of the cutter when the relative size of the device and thickness of the plate will permit. It is to be noted, however, that the diameter of the hole is actually a little larger than the diameter of the container, this being due to an outward movement of the cutter and expansion of the bottom of the container.

The cutter being of concave ring form as herein shown cuts a circular opening in the plate and the central disc falls clear on operation. Thus the cutter is far more effective and efficient in penetrating qualities than were the explosive force to be applied to a solid punch acting on the entire area of the opening to be cut.

In other words, if the container 6 is, say, four inches in inside diameter, the cutter 8 should be about four inches from the bottom and will punch on opening or circle through a mild steel plate about ¾ inch in thickness and about 4¾ inches in diameter. Accordingly, the size of the container may be selected according to the thickness of the plate and the hole to be punched. The amount of explosive may be varied as desired. Thus a four inch hole on a quarter inch stock requires less explosive.

It frequently happens in engineering, mining and construction problems, as well as in other cases, that it is necessary to quickly force an opening through a metal plate or the like, when an acetylene torch or boring machine, or other complicated apparatus, is not available.

The present device is directed to a complete, compact and self-contained mechanism which may be easily and quickly conveyed, placed or positioned with respect to the plate to be perforated and actuated to accomplish the penetration, all in a very short space of time. The action of the device is limited to a very specific zone of the obstacle. By way of example, a building may be on fire and sections of the building protected from other sections by means of flat steel fire-doors either in the walls or floor which are possibly locked or otherwise secured against movement. Assuming that firemen desire to get a stream of water to such burning part of the building, or even through the floor of the building, one of these small, portable, self-contained mechanisms, say three or four inches in diameter, may be placed against the sheet material to be perforated and ignited by a fuse, detonator or even a flashlight battery 15, to almost instantly cut or punch the desired hole through the door or floor, after which a hose could be inserted through the opening and the desired results accomplished. Containers of chemical substances can also be pushed or projected through the aperture thus produced.

It is thus seen that the present invention contemplates a simple and practical mechanism as well as a method for quickly cutting or punching holes through sheet material and is well adapted to accomplish, among others, all of the objects and advantages herein set forth.

In using such terms as "upper," "lower," "bottom," etc., these are to be interpreted as being relative or in relation to the drawings showing one of various possible embodiments or applications. Obviously the device could be applied to a vertical surface such as a sheet metal door or the like.

As many changes could be made in carrying out the above constructions without departing from the scope of the invention, it is intended that all matter contained in the above description or shown in the accompanying drawing shall be interpreted as illustrative and not in a limiting sense.

I claim:

1. [A self-contained cutter or punch for sheet material comprising a container adapted to be positioned adjacent the plate to be cut or punched, a collapsible concave tool within the container spaced from the plate a material distance, *the concave surface of said tool facing said material,* an explosive within the container and on the other side of said tool with respect to the plate whereby, on detonating the explosive, the tool is freed from the container by collapsing its sides and driven into said sheet.]

2. [A cutter or punch as set forth in claim 1, in which the tool is V-shaped in cross-section.]

3. A self-contained cutter or punch for sheet material comprising a container adapted to be positioned adjacent the plate to be cut or punched, a collapsible concave tool within the container spaced from the plate a material distance, *the concave surface of said tool facing said material,* said tool being of [ring-form] *annulus-form* and V-shaped in cross-section [on any radius of the ring], an explosive within the container and on the other side of said tool with respect to the plate whereby, on detonating the explosive, the tool is freed from the container by collapsing its sides and driven into said sheet.

4. A self-contained cutter or punch for sheet material comprising a container adapted to be positioned adjacent the plate to be cut or punched, a collapsible concave tool within the container spaced from the plate a material distance, said tool being of [ring form] *annulus-form* and V-shaped in cross-section, an explosive within the container and on the other side of said tool with respect to the plate, the open end of the V facing the plate to be cut and the point of the V being adjacent the said explosive, whereby, on detonation of the explosive, the tool is freed from the container by collapsing its sides and driven into the sheet.

5. [A substantially cylindrical container of a height slightly in excess of its diameter, the half adjacent the plate to be cut being free and unobstructed, a tool in the container positioned near the middle of the container and held in position largely by frictional engagement with the container, and an explosive in the container between the tool and the outer end of the container, said tool being V-shaped in cross-section.]

6. A substantially cylindrical container of a height slightly in excess of its diameter, the half adjacent the plate to be cut being free and unobstructed, a tool in the container positioned near the middle of the container and held in position largely by frictional engagement with the container, and an explosive in the container between the tool and the outer end of the container, said tool being annular in form and V-shaped in cross-section on any radius whereby on detonating the explosive the tool is deformed by bringing the sides of the V into contact and freed from contact with the sides of the container and driven through the plate.

7. A container of a height or length slightly in excess of its transverse dimension and having a smooth internal surface, a centrally disposed guide within said container, an annular tool positioned in the container and about the guide and held in position largely by its frictional contact with the guide and the inner surface of the container and spaced from the plate to be cut a distance substantially equal to the diameter of the container, and an explosive adjacent the tool and on its opposite side from the plate to be perforated whereby on detonating the explosive the tool is deformed and freed from contact with the sides of the container and driven as a cutting ring into the plate.

8. An apparatus as set forth in claim 7 in which the tool is V-shaped in cross-section taken on any radius.

9. An apparatus as set forth in claim 7 in which the tool is V-shaped in cross-section taken on any radius and the open end of the V faces the plate to be cut.

10. [A device of the character described comprising a substantially cylindrical container, the lower part of which provides a free and unobstructed bore, a cutting tool within the bore and positioned a material distance up said unobstructed bore, said cutting tool comprising a concave member facing downwardly, and explosive material on the upper side of said concave member adapted to collapse said concave cutter and weld the sides thereof by the heat of the explosion into a substantially solid cutting tool adapted to be driven through the plate by the force of the explosive.]

11. A device of the character described comprising a substantially cylindrical container, the lower part of which provides a free and unobstructed bore, a cutting tool within the bore and positioned a material distance up said unobstructed bore, said cutting tool comprising an annular concave member facing downwardly, and an explosive material on the upper side of said concave member adapted to collapse said concave cutter and weld the sides thereof by the heat of the explosion into a substantially solid cutting tool adapted to be driven through the plate by the force of the explosive.

12. [A device of the character described, comprising a substantially cylindrical container with an inverted concave cutting tool positioned therein and embedded in and held in position by an explosive on its upper side, the lower part of said container providing a free and unobstructed bore for said tool, and means for detonating said explosive thereby to drive said cutter downwardly with great velocity and simultaneously fuse and collapse its sides to form a substantially solid cutting member.]

13. A device of the character described comprising a substantially cylindrical container with an inverted [ring-form] *annular* concave cutting tool positioned therein and embedded in and held in position by an explosive on its upper side, the lower part of said container providing a free and unobstructed bore for said tool, and means for detonating said explosive thereby to drive said cutter downwardly with greater velocity and simultaneously fuse and collapse its sides to form a substantially solid cutting member.

14. The herein described tool for cutting or punching an opening in sheet metal or the like comprising a container having an explosive and detonator, and a collapsible *annular* concave cutter or punch ring in the proximity of the sheet to be perforated, with the concave surface of the cutter facing the sheet metal and spaced at a material distance therefrom, whereby on detonating the explosive the sides of the tool are collapsed and fused into substantially one solid mass with a sharp cutting edge adapted to be driven through the sheet to be cut or punched.

15. [The herein described method of cutting or punching out a disc in sheet metal or the like, comprising the steps of positioning a container having an explosive and a collapsible inverted concave cutter ring adjacent the plate to be cut with the cutter ring freely spaced a material distance therefrom, and detonating the explosive to collapse the ring and fuse the sides of the concave cutter ring by the heat of explosion into on substantially solid mass to drive the ring through the plate and to cut a disc out of the plate.]

16. *A self-contained cutter or punch comprising a container adapted to be positioned adjacent the material to be cut or punched, a collapsible annular concave tool of ring-form within the container spaced from the material a material distance, the concave surface of said tool facing said material, and an explosive within the container and on the other side of said tool with respect to the said material.*

17. *A self-contained cutter or punch comprising a container adapted to be positioned adjacent the material to be cut or punched, a collapsible annular trough-shaped tool within the container spaced from the material a material distance, the open side of said tool facing said material, and an explosive within the container and on the other side of said tool with respect to the said material.*

18. *A self-contained cutter or punch comprising a container adapted to be positioned adjacent the material to be cut or punched, a collapsible annular trough-shaped tool having a V-shaped cross-section within the container spaced from the material a material distance, the open end of the V facing said material, and an explosive within the container and on the other side of said tool with respect to the said material.*

19. *A self-contained cutter or punch comprising a container adapted to be positioned adjacent the material to be cut or punched, a collapsible annular tool of ring-form having a V-shaped cross-section within the container spaced from the material a material distance, the open end of the V facing said material, and an explosive within the container and on the other side of said tool with respect to the said material.*

20. *A cutter or punch comprising a collapsible annular concave tool adapted to be positioned adjacent to but spaced from a material to be cut or punched, the concave surface of said tool facing said material, and an explosive on the other side of said tool with respect to the said material.*

21. *A cutter or punch comprising a collapsible annular concave tool of ring-form adapted to be positioned adjacent to but spaced from a material to be cut or punched, the concave surface of said tool facing said material, and an explosive on the other side of said tool with respect to the said material.*

22. *A cutter or punch comprising a collapsible annular trough-shaped tool adapted to be positioned adjacent to but spaced from a material to be cut or punched, the open side of said tool facing said material, and an explosive on the other side of said tool with respect to the said material.*

23. *A cutter or punch comprising a collapsible annular trough-shaped tool having a V-shaped cross-section adapted to be positioned adjacent to but spaced from a material to be cut or punched, the open end of the V facing said material, and an explosive on the other side of said tool with respect to the said material.*

24. *A cutter or punch comprising a collapsible*

*annular tool of ring-form having a V-shaped cross-section adapted to be positioned adjacent to but spaced from a material to be cut or punched, the open end of the V facing said material, and an explosive on the other side of said tool with respect to the said material.*

HENRY H. MOHAUPT.

REFERENCES CITED

The following references are of record in the file of this patent or the original patent:

UNITED STATES PATENTS

| Number | Name | Date |
|---|---|---|
| 223,767 | Shaw | Jan. 30, 1880 |
| 1,288,107 | Messer | Dec. 17, 1918 |
| 1,440,601 | Holran | Jan. 2, 1923 |
| 1,569,153 | Temple | Jan. 12, 1926 |
| 2,017,329 | Temple | Oct. 15, 1935 |
| 2,189,439 | Temple | Feb. 6, 1940 |
| 2,213,435 | Temple | Sept. 3, 1940 |
| 2,399,211 | Davis et al. | Apr. 30, 1946 |

FOREIGN PATENTS

| Number | Country | Date |
|---|---|---|
| 28,030 | Great Britain | Dec. 13, 1911 |